(12) United States Patent
Köppen et al.

(10) Patent No.: US 9,895,629 B2
(45) Date of Patent: Feb. 20, 2018

(54) CONTACT AND SEPARATION COLUMN AND TRAY

(71) Applicants: SHELL INTERNATIONALE RESEARCH MAATSCHAPPIJ B.V., The Hague (NL); SHELL OIL COMPANY, Houston, TX (US)

(72) Inventors: Jannes Köppen, Amsterdam (NL); Eric Johannes Vos, Amsterdam (NL); Peter Mervyn Wilkinson, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 269 days.

(21) Appl. No.: 14/365,288

(22) PCT Filed: Dec. 14, 2012

(86) PCT No.: PCT/EP2012/075600
§ 371 (c)(1),
(2) Date: Jun. 13, 2014

(87) PCT Pub. No.: WO2013/087866
PCT Pub. Date: Jun. 20, 2013

(65) Prior Publication Data
US 2014/0345460 A1    Nov. 27, 2014

(30) Foreign Application Priority Data
Dec. 16, 2011 (EP) ..................................... 11194119

(51) Int. Cl.
*B01D 19/00* (2006.01)
*B01D 53/14* (2006.01)
(Continued)

(52) U.S. Cl.
CPC ............ *B01D 19/0057* (2013.01); *B01D 3/20* (2013.01); *B01D 53/18* (2013.01); *B01D 53/185* (2013.01);
(Continued)

(58) Field of Classification Search
CPC ...... B01D 19/0057; B01D 2252/20484; B01D 2252/20489; B01D 2256/245;
(Continued)

(56) References Cited

U.S. PATENT DOCUMENTS 3,364,988 A    1/1968   Hartmann
3,722,839 A *  3/1973   Erickson ................. B01D 3/14
                                                  261/111

(Continued)

FOREIGN PATENT DOCUMENTS

CN    1077136     10/1993
DE    19828884    9/1999
(Continued)

OTHER PUBLICATIONS

Encyclopedia Britannica, Venturi Effect, accessed May 2, 2016.*

*Primary Examiner* — Cabrena Holecek

(57) ABSTRACT

A contact and separation column (1) encasing a stack of one or more contact and separation cells (3). Each cell comprises: —a tray (4) with gas flow openings (6) opening into contact and separation units (7); —a downcomer (16) defining a liquid discharge; and —a liquid supply (17). Each contact and separation unit (7) comprises an upstream contact zone (8, 9) with liquid inlets (12), and one or more downstream separation zones (10) provided with a swirler (13) and a top end with a gas outlet (14). The swirler (13) is located at a distance from the gas inlet of from 50 to 90 % of the total length of the contact and separation zone. Process for treating a gas with such a column.

13 Claims, 3 Drawing Sheets

(51) Int. Cl.
*B01D 3/20* (2006.01)
*B01D 53/18* (2006.01)
*C10L 3/10* (2006.01)

(52) U.S. Cl.
CPC .......... *C10L 3/102* (2013.01); *B01D 53/1462* (2013.01); *B01D 2252/20484* (2013.01); *B01D 2252/20489* (2013.01); *B01D 2256/245* (2013.01); *B01D 2257/304* (2013.01); *B01D 2257/504* (2013.01); *Y02P 70/34* (2015.11)

(58) Field of Classification Search
CPC ........ B01D 2257/304; B01D 2257/504; B01D 3/20; B01D 53/1462; B01D 53/18; B01D 53/185; C10L 3/102; Y02P 70/34
See application file for complete search history.

(56) References Cited

U.S. PATENT DOCUMENTS

| | | | |
|---|---|---|---|
| 4,349,360 | A | 9/1982 | Schuurmans et al. |
| 6,227,524 | B1 | 5/2001 | Kiselev et al. |
| 7,594,942 | B2 | 9/2009 | Polderman |
| 2004/0026801 | A1* | 2/2004 | Konijn .................... B01D 3/20 |
| | | | 261/114.1 |

FOREIGN PATENT DOCUMENTS

| | | |
|---|---|---|
| EP | 0048508 | 3/1982 |
| WO | 2005023396 | 3/2005 |
| WO | 2009004036 | 1/2009 |

* cited by examiner

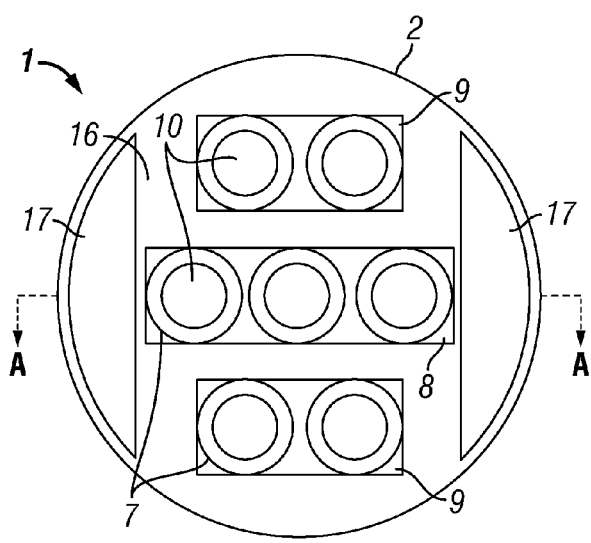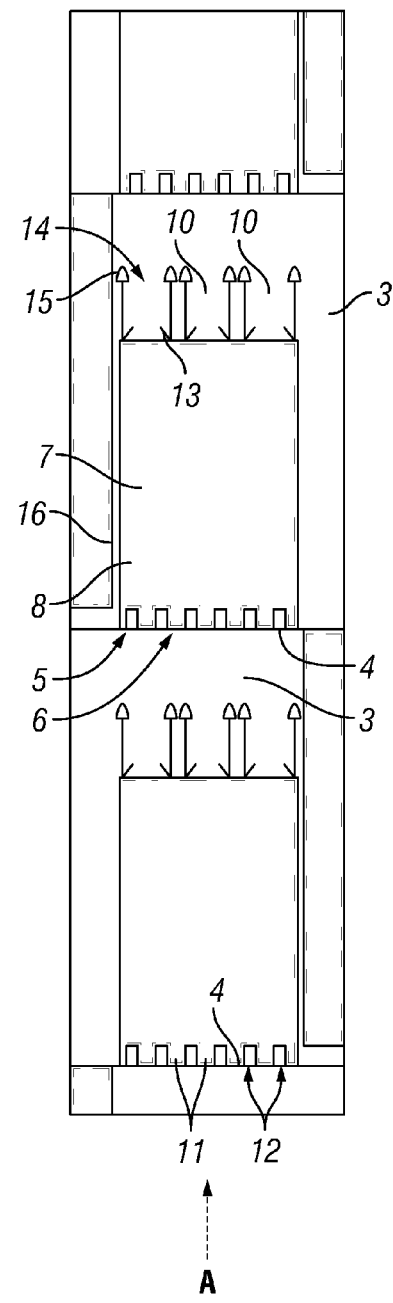
FIG. 1
FIG. 2

CONTACT AND SEPARATION COLUMN AND TRAY

PRIORITY CLAIM

The present application is the National Stage (§ 371) of International Application No. PCT/EP2012/075600, filed Dec. 14, 2012, which claims priority from European application no. 11194119.1, filed Dec. 16, 2011, the disclosures of which are incorporated herein by reference.

FIELD OF THE INVENTION

The present invention relates to a contact and separation column, particularly for high capacity gas/liquid mass transfer, with a stack of one or more contact and separation cells, where gas is intensively contacted with a liquid, which is first entrained with the gas flow and which is subsequently removed from the gas flow by centrifugal impact of a swirler. The invention also pertains to a tray to be used in such a column and to a process for treating a gas with such a column.

The column can for instance be a heat transfer column, a fractionation column, a stripping column or a treating column, in particular a treating column, more particular a column for treating natural gas, to remove contaminants, such as carbon dioxide and/or hydrogen sulphide.

BACKGROUND OF THE INVENTION

The term gas shall be used herein so as to also include vapour while the term liquid also includes liquid containing gas such as froth. The expression treating liquid is used to indicate compounds, preferably liquids, which selectively removes contaminants such as hydrogen sulphide and/or carbon dioxide by physical and/or chemical phenomena.

Trays for gas/liquid mass transfer containing a cyclonic gas/liquid separation device differ from regular mass transfer trays in their range of applications. A tray in which gas and liquid are contacted and subsequently separated with a cyclonic gas/liquid device can be made significantly more compact than a regular tray where the separation between gas and liquid is by gravitational forces instead of centrifugal forces.

U.S. Pat. No. 6,227,524 describes contact and separation elements (CSE's) for high speed mass transfer trays in which liquid enters the CSE through an annular row of holes into a grid net of vertical vanes dispersing the liquid into small droplets which together with the gas move to the vanes of an axial swirler located directly above the vertical vanes in which swirler the liquid-gas flow is subjected to a rotary motion thereby creating an upwardly moving rotating liquid film. The final gas/liquid separation takes place in the separation zone located in the upper part of the CSE, while the mass transfer mainly takes place in a small zone just above the liquid inlet holes. The amount of liquid entering the contact zone depends on a force balance where the liquid level (as set by the height of the weir) around the CSE provides a hydrostatic force for liquid to enter the CSE. In addition the gas flow inside the CSE induces a suction force which increases inflow of liquid into the CSE. These two forces are balanced by a counterforce resulting from a pressure drop over the CSE, particularly induced by the swirler and the narrowing transition between the upstream contact zone and the downstream separation zone. Ultimately the maximum capacity of this CSE will depend on the pressure balance: as the gas rate to the device is increased the pressure drop will increase. When the pressure drop inside the contact zone exceeds a certain value (which depends on the liquid height surrounding the CSE) part of the gas will escape through the liquid inlets at which point the mass-transfer performance will drop dramatically.

EP-A-0048508 describes an apparatus for treating mixtures of liquid and gas at high flow velocities and/or high liquid loads. The liquid flows through in once-through mode, i.e. without internal recycle. Furthermore, the volume of the contact zone is small compared to the volume of the separation zone and the swirler is located in the bottom part of contact and separation unit.

The mass transfer rate is related to the amount of liquid entrained per unit of gas in the contact zone. The required volumetric mass transfer rates increase with higher partial pressure of the impurities (such as $CO_2$) to be absorbed. However, mass transfer rates obtainable with prior art contact and separation columns were found to be limited.

In offshore gas mining contact and separation columns are used with floating applications, e.g. on a floating device or boat. Sea motion induced sloshing or waving of the liquid poses serious limitations on the obtainable mass transfer and the effectiveness of the columns.

It is an object of the invention to provide contact and separation equipment enabling improved mass transfer.

It is a further object of the invention to provide robust contact and separation equipment which can be used with floating applications.

SUMMARY OF THE INVENTION

A contact and separation column is disclosed comprising a column wall encasing a stack of one or more contact and separation cells, wherein each cell comprises:
  a tray with a number of gas flow openings opening into one or more contact and separation units, wherein each contact and separation unit comprises an upstream contact zone with liquid inlets, and one or more separation zones provided with a swirler and a top end with a gas outlet;
  a downcomer defining a liquid discharge for liquid overflowing the downcomer, which has a height exceeding the level of the liquid inlets;
  a liquid supply for supplying liquid to the contact and separation cell;
wherein the swirler is located at a distance from the gas inlet of from 50 to 90% of the total length of the contact and separation zone.

In a second aspect, a contact and separation tray is disclosed for use in the disclosed column.

In a third aspect a process for treating gas is disclosed making use of the disclosed column.

Brief Description of the Drawings

The invention will now be described by way of example in more detail, with reference to the drawings, wherein:

FIG. 1 shows schematically in plan view a contact and separation column of the invention;

FIG. 2 shows the column of FIG. 1 in a longitudinal cross section along line A-A in FIG. 1;

DETAILED DESCRIPTION

Figure 3:
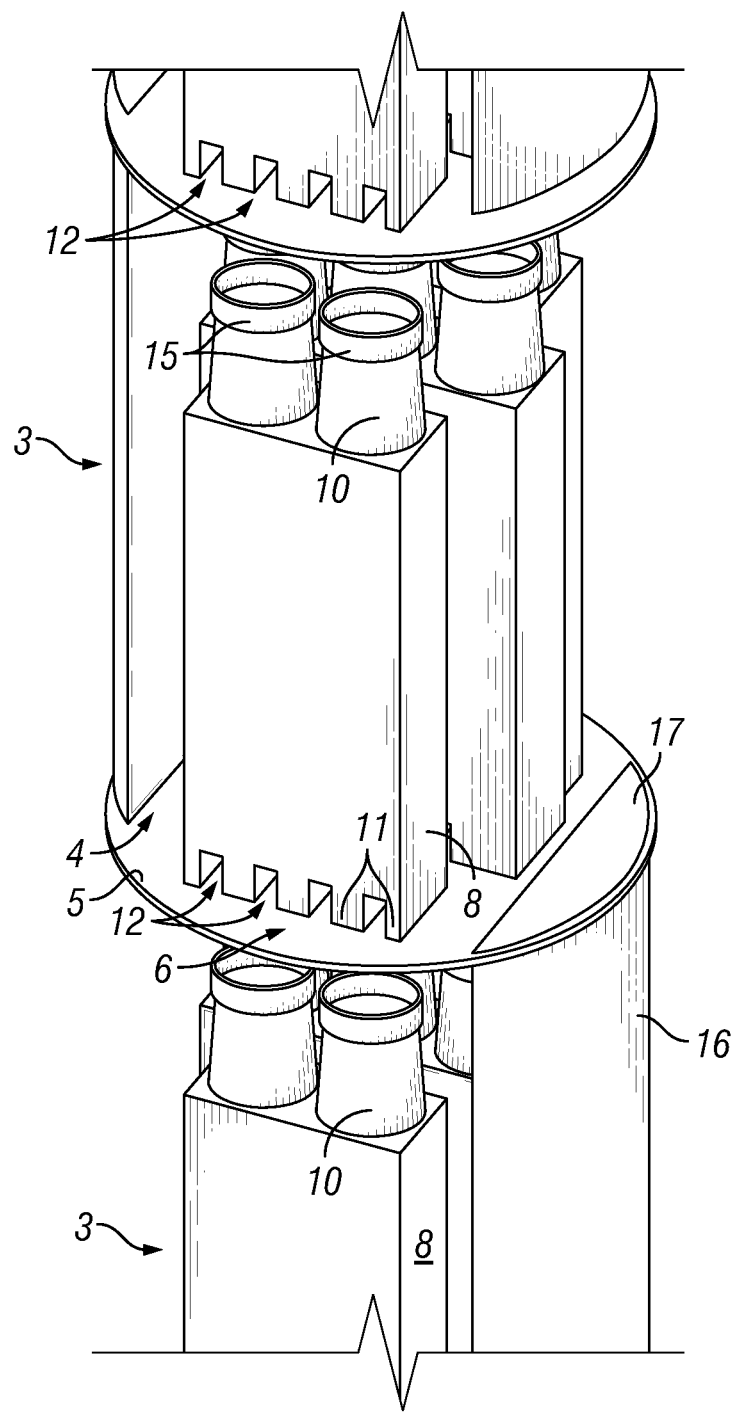
FIG. 3 shows a section of the interior of the column of FIG. 1 in perspective view.

By having the swirler located at a distance from the gas inlet, the volume available for contacting becomes larger which provides for a substantial increase of the mean residence time in the contact zone and, consequently, of the volumetric gas/liquid mass transfer rate.

The swirler is located at a distance from the gas inlet of from 50 to 90% of the total length of the contact and separation zone, preferably from 60 to 90%, more preferably from 65 to 85%.

The volumetric gas/liquid mass transfer rate can be further improved by ensuring that the contact zone has a larger cross-sectional area than the one or more separation zones in the unit in question. The cross-sectional area is the surface area of the section made by a plane cutting the middle of the zone in question at a right angle to the longest axis of the contact and separation cell. The middle of a zone is taken in the direction of the longest axis of the contact and separation zone together.

The cross-sectional area of the separation zone or zones of the unit in question is the sum of cross-sectional areas of all separation zones in fluid connection with the contact zone in question.

If the cross-sectional area of the contact zone is larger than the one of the separation zone, the flow velocity of the gas in the contact zone will typically be lower than the flow velocity in the separation zone. While lower flow velocities result in improved mass transfer in the contact zone, faster flow velocities in the separation zone result in improved separation. The flow velocity can be represented by the Souders-Brown density corrected gas load factor $Cs=U_{Gas}*(\rho_{Gas}/(\rho_{Liquid}-\rho_{Gas}))^{1/2}$.

To obtain a good centrifugal separation at the swirler this factor can for instance be in the range of 0.3 m/s<Cs<1.5 m/s. Such velocities are very high, particularly compared with regular prior art contacting devices (e.g., with trays or packing), which typically operate at a Cs factor below 0.1 m/s. In the contact zone such flow velocities would lead to very short gas/liquid contacting times and low mass transfer rates. Due to the larger cross-sectional area in the contact zone, the flow velocity can be substantially lower. The flow velocity of the gas in the contact zone can typically be at most 90%, preferably at most 80% or even more preferably at most 50% of the flow velocity in the separation zone.

An additional advantage of a larger cross-sectional area of the contact zone is that it provides space for a larger gas inlet area and a larger liquid inlet area, which will reduce the pressure drop for the gas and liquid to enter the contact zone and thus lead to a higher liquid suction rate while also contributing to better mass transfer.

A further advantage of the present invention is that it allows recycle of the liquid in a contact and separation unit which makes that there is flexibility in the volume of fresh liquid to be sent to the unit in question.

In a specific embodiment the downcomers of the trays can be arranged offset relative to downcomers of a next tray, e.g., alternately at opposite sides in adjacent cells, wherein the liquid discharge of an upper contact and separation cell forms the liquid supply of a lower contact and separation cell. Liquid flowing into the downcomer of an upper cell flows into the underlying cell where it is circulated once again until it flows into the next downcomer.

The expression "upstream" and "downstream" is used with respect with the swirler.

The cross-sectional area of the contact zone can for instance be at least 30% larger than the cross-sectional area of a single separation zone, more specifically at least 50%, more preferably at least 80%, most preferably at least 100%.

Preferably, the cross-sectional area of a contact zone is at least 5% larger than the cross-sectional area of all separation zones belonging to the same unit as this contact zone, more specifically at least 8%, more preferably at least 10%. Most preferably, the cross-sectional area of a contact zone is at most 50% larger than the cross-sectional area of all separation zones belonging to the same unit as this contact zone.

Furthermore, the volume of a contact zone preferably is at least 50% larger than the volume of all separation zones in direct fluid communication with the contact zone in question, more specifically at least 80%, more preferably at least 100% larger.

The downcomers at an edge of the tray can comprise a weir which weir and the edge are spaced from the column wall to define the liquid discharge for liquid overflowing the weir. The weir can be part of the tray or it can be a separate part. In an alternative embodiment, the downcomer can for instance be a pipe or any other suitable type of conduit. The tray may have one or more downcomers of the same or different types.

The contact zone is provided with one or more inlets for supplying liquid into the gas flow at a level below the top end of the downcomer. In use the liquid inlets are submerged in the liquid on the tray, i.e. the liquid inlets are below the liquid level of normal operation. Preferably, the liquid inlets are at or near the gas flow openings in the base plate of the tray, most preferably the liquid inlets are covered by the gas inlets. The liquid inlets can for example be slits or circular, square or triangular holes or of any desirable alternative shape.

Optionally, liquid distributing means can be used for distributing the liquid over the area of the gas flow openings in the tray. This way, liquid is not only introduced peripherally into the gas flow, but a more equal liquid distribution is obtained over the full gas flow area. It has been found that this substantially increases the mass transfer rate. Moreover, larger gas flow openings and contact zones with larger cross-sectional areas can be used, while maintaining high mass transfer rates. Examples of guiding means which can be applied are vanes or gutters, e.g., with a rectangular, semi-circular or V-shaped cross section.

The swirler can for example be a vane assembly imparting a rotary movement to the gas/liquid mixture. By this rotary movement the liquid droplets of the gas/liquid mixture are flung outwardly to impinge and coalesce on the inner surface of the conduit.

In a specific embodiment the contact zone is such that its cross section is a square or rectangle. Preferably, the contact zone may have the shape of a box, carrying one or more tubular separation zones, such as cylindrical or conical separation zones. Due to the box shape the contact zones can be arranged close together, using a high proportion of the available space in the respective cell.

Preferably, the gas outlet of the top end of the separation zone is bordered by a liquid flow deflector.

Optionally, the liquid flow deflector comprises a return skirt having a U-shaped radial cross section with an open side arranged over a top edge of the separation zone. Due to the centrifugal impact of the swirler, liquid borne by the passing gas is collected on the cylindrical or conical inner wall of the separation zone, where it flows upwardly under the influence of the passing gas flow. At the upper edge of the contact zone, gas flows upwardly through the outlet, while the separated liquid is deflected by the return skirt to flow down again outside the contact zone.

In a specific embodiment the cross-sectional area of the contact zones together take up the majority of tray surface, typically at least 60%, more specifically at least 70%, and preferably at least 80%. In this respect the cross-sectional area of the contact zones refers to the joint cross section of all contact zones connected to the tray in question. The cross-sectional area of the separation zones is not taken into account.

The high density of contact and separation zones reduces sensitivity to sea motion induced tilt and motion, which makes this device very suitable for floating applications. Fluid behaviour inside the contacting and separation zones is virtually independent of external motion and is dominated by the high gas flow rate inside the contact and separation zone. Wave formation due to tilt or motion can occur at the liquid surface between the contact and separation zones. However, due to the limited space in between the contact and separation zones waves cannot evolve, since the contact and separation zones will dampen the wave formation.

When waves develop due to tilt or motion, the liquid level on the tray will vary, but the impact will remain very small as long as the wave height is relatively small in comparison with the average liquid level on the tray. The liquid level on the tray can be further increased by increasing the weir height, and optionally also tray spacing. Weir heights (up to 700 mm) which are like a factor 10 higher than on regular trays have been successfully tested for this purpose.

The one or more contact and separation trays may form a separate or integral part of the contact and separation column. The tray comprises a base plate with a number of gas flow openings opening into one or more contact and separation units positioned on an upper side of the base plate. In a specific embodiment, each contact and separation unit comprises an upstream contact zone with liquid inlets which liquid inlets preferably are within the scope of the gas flow openings, one or more downstream separation zones provided with a swirler and a top end with a gas outlet bordered by a liquid flow deflector; wherein the contact zone has a larger cross-sectional area than the separation zone.

The tray can comprise a weir at one or more of the tray edges which weir can be part of the tray itself or it can be a separate part or part of the column wall.

In a specific exemplary embodiment of the tray, the contact and separation zones comprise a box shaped contact zone opening into one or more tubular separation zones, typically cylindrical and/or conical separation zones.

The contact zone can be empty, allowing free flow of the passing gas, or it may wholly or partly contain a packing material, such as corrugated plate material and/or wire mesh material. Such packing material increases the residence time of the liquid in the contact zone and, consequently, such packing supports further mass transfer.

The column of the present invention will further be provided with a liquid inlet, a liquid outlet, a gas inlet and a gas outlet.

The disclosed contact and separation column can be used for a process for treating gas with a liquid. To this end, gas is introduced into the contact and separation zones via the gas flow openings, while treating liquid at the liquid inlet in a lower contact and separation cell of a contact and separation column.

The process can for example be used for treatment of gases comprising water, carbon dioxide and/or hydrogen sulphide, such as natural gas or shale gas. If mainly water is removed, the process generally is called dehydration. Most preferably, the process is used for removing carbon dioxide and/or hydrogen sulphide.

Natural gas is a hydrocarbon gas mixture containing a a substantial amount, typically consisting of at least 40% wt, specifically at least 50% wt, most specifically of from 60 to 95% wt, of methane. It is customary to temporarily liquefy natural gas for ease of storage or transport. To prepare natural gas for liquefaction it is treated to remove components that would freeze under liquefaction conditions or that would be destructive to liquefaction equipment, such as water, hydrogen sulphide and carbon dioxide. The liquids for treating the gas can be any liquid known to be suitable for this purpose. Typically, the liquids for removing the undesired compounds will contain water, glycols, methanol and/or amines, more specifically will be aqueous solutions of one or more amines, more specifically alkylamines, more specifically one or more compounds chosen from the group consisting of monoethanolamine, diethanolamine, methyldiethanolamine, diisopropanolamine and aminoethoxyethanol.

The mass transfer further can be improved by adding compounds known as accelerators which further increase the speed of chemical and/or physical interaction between the natural gas and the treating liquid. The mass transfer can be increased further by using a higher temperature for example by up to at most 30° C. above the normal operating temperature.

A further advantage of the intense mixing that takes place in the contact zone of the present invention is the increased selectivity for removing contaminants which have a higher absorption rate into the liquid. Intense mixing for example tends to favour absorption of hydrogen sulphide over carbon dioxide which is highly advantageous when treating natural gas The disclosed process generally is designed to give almost pure methane.

The process can also be used for treatment of other gases or for stripping or fractionation, if so desired.

Figure 4:
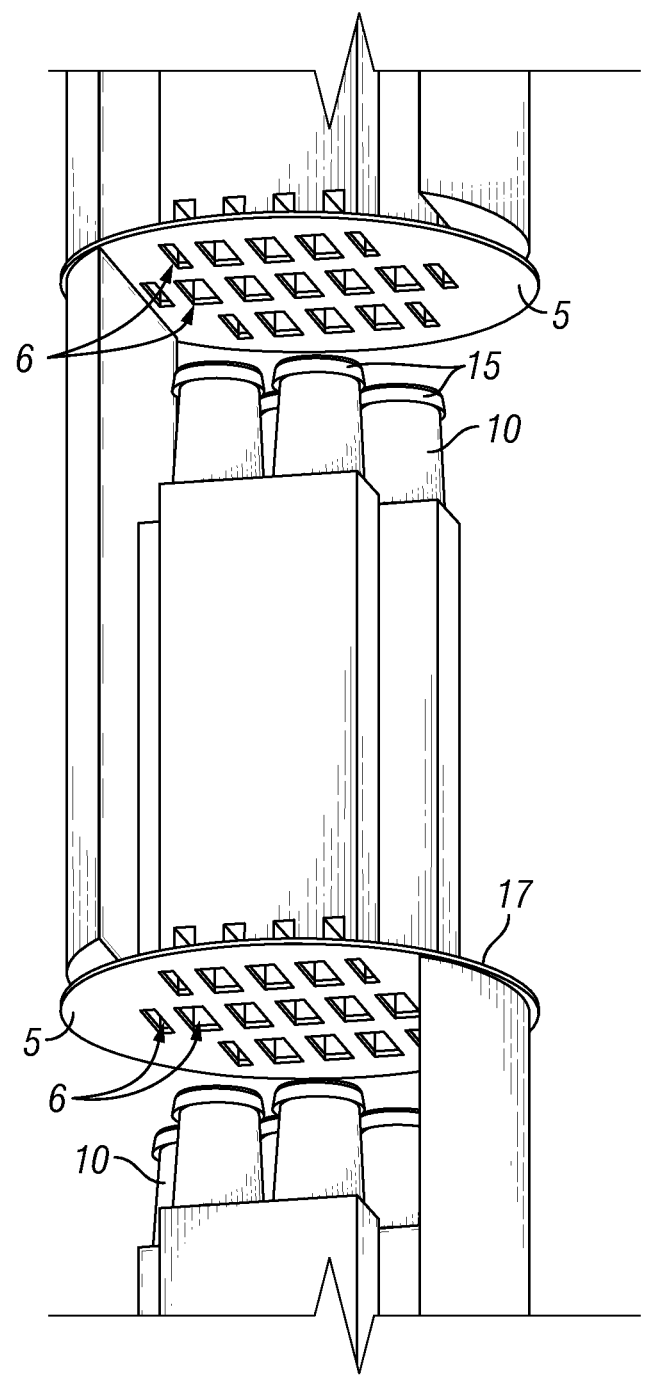
FIG. 4 shows a different perspective view of the section shown in FIG. 3.

FIGS. 1-4 show a contact and separation column 1 comprising a column wall 2 encasing a stack of two contact and separation cells 3. Each cell 3 comprises a tray 4 with a base plate 5 provided with a number of gas flow openings 6 opening into a respective contact and separation unit 7 positioned on the upper side of the tray 4. Each contact and separation unit 7 comprises a box-shaped upstream contact zone 8, 9 and cylindrical separation zones 10 on top of the contact zone 8, 9. The box shaped contact zones 8, 9 include a larger middle box 8 and two smaller boxes 9 flanking the larger middle one. The larger middle contact zone 8 carries a row of three separation zones 10, while the two smaller ones carry only two separation zones 10 as shown in FIG. 1. This way, the cross-sectional area of each of the contact zones 8, 9 is larger than the joint cross-sectional areas of the separation zones 10 in fluid connection with a single contact zone. As the contact zone furthermore is much higher than the separation zones, the volume of the contact zone is much larger than the volume of the separation zones 10 in fluid connection with a single contact zone.

At their lower ends the contact and separation units 7 comprise a set of parallel vertical plates 11 bridging the gas flow openings 6 and spacing the contact zone 8, 9 from the base plate 5. Gas can flow through the gas flow openings 6 via the space between the vertical plates 11 into the contact zones 8, 9. The vertical plates 11 define inlets 12 for liquid present in the cell 3.

The cylindrical separation zones 10 are provided with a swirler 13 within their lower end. The top end 14 of the separation zone forms a gas outlet which is bordered by a liquid flow deflector 15 formed by a ring with a U-shaped radial cross section with the open side arranged over the top edge of the separation zone 10.

The tray 4 further comprises an edge with a weir, which is spaced from the column wall 2 to define a liquid discharge 17 for discharging liquid overflowing the weir to a lower cell 3. The height of the weir determines the level of liquid present in the cell 3. At the lower side of the tray 4 the weir extends to a distance above the base plate 5 of a lower tray 4. This distance corresponds to the height of the vertical plates 11. This way, the weir and the adjacent section of the column wall 2 define a downcomer 16 serving as a liquid supply 17 for the next cell 3 below.

The trays 4 in the column 1 are arranged in a mirrored position relative to adjacent upper or lower trays. As a result, the weir of each tray 4 is placed at a side of the column which is opposite to the side where the weir of a tray 4 above or below is arranged. With such an arrangement the weir of each tray 4 forms a downcomer 16 supplying liquid to the next lower cell 3. In alternative embodiments, other types of downcomers, such as pipes, can also be used.

Liquid flows down from a downcomer 16 into a cell 3, where the liquid is collected until it reaches the level of the upper edge of the weir. Meanwhile gas flows in the direction indicated by the arrow A in FIG. 2. The gas flows via the gas flow openings 6 upwardly into the cell 3, via the contact zones 8, 9 and the separation zones 10 into the gas flow openings 6 of a next upper cell 3. At the liquid inlets 12 of the contact zones 8, 9 the liquid is forced to flow into the contact zone 8, 9 by a hydrostatic force and a suction force exerted by the passing gas flow. These forces are balanced by a counter force resulting from the pressure drop in the gas flow due to the narrowing cross-sectional area. Liquid will gradually enter the contact zone 8, 9 and be dispersed into the passing gas flow. Due to the vertical plates 11 the liquid does not only enter the gas flow at the periphery of the contact zone, but over a larger area of the gas flow, resulting in an improved mass transfer of liquid into the gas flow. The contact zone 8, 9 is relatively high which contributes to a more intense contact between liquid and gas. When passing the swirler 13, the gas flow undergoes a centrifugal force. As a result liquid borne by the gas flow will be swept against the inner wall of the separation zone 10 and pushed upwardly by the passing gas flow. The gas flow exits the separation zone 10 via the outlet 14. The separated liquid reaching the top edge of the separation zone 8 is deflected by the return skirt 15 to the outer side of the cylindrical wall, where it flows downwardly back into the liquid of the cell 3.

That which is claimed is:

1. A contact and separation column comprising a column wall encasing a stack of one or more contact and separation cells, wherein each contact and separation cell comprises:
   a liquid supply for supplying liquid to the contact and separation cell;
   a downcomer defining a liquid discharge;
   a tray with a number of gas flow openings opening into one or more contact and separation units positioned on an upper side of the tray, the tray being adapted to hold a layer of the liquid,
   wherein each contact and separation unit comprises an upstream contact zone defined by vertical plates connected to the tray and positioned to receive gas flowing through the gas flow openings, wherein the vertical plates have liquid inlets located near the tray and wherein the liquid inlets provide for liquid flow from the layer of the liquid into the upstream contact zone, and
   one or more downstream separation zones each defined by a body and which are connected to upper ends of the vertical plates of the upstream contact zone to be in fluid communication with the upstream contact zone, wherein each body has a lower end provided with a swirler and a top end defining a gas outlet,
   the swirler being located at a distance from the tray of from 50 to 90% of the total length of the contact and separation cell,
   the contact zone of each contact and separation unit having a larger cross-sectional area than the corresponding one or more separation zones.

2. The contact and separation column according to claim 1, wherein the upstream contact zone defined by the vertical plates has a contact zone volume, wherein each downstream separation zone defined by its body has a separation zone volume, wherein the contact zone volume is at least 50% larger than the sum of the separation zone& volumes of the downstream separation zones associated with the upstream contact zone.

3. The contact and separation column according to claim 1, wherein the cross-section of the contact zone is a square or rectangle.

4. The contact and separation column according to claim 1, wherein a contact and separation unit comprises a single contact zone and a plurality of separation zones.

5. The contact and separation column according to claim 1, wherein at least part of the contact zones is filled with a packing material.

6. The contact and separation column according to claim 1, wherein the downcomers in adjacent cells are offset relative to each other and wherein the liquid discharge of an upper contact and separation cell forms the liquid supply of a lower contact and separation cell.

7. The contact and separation column according to claim 1, wherein at an edge of the tray downcomers comprise a weir, wherein the weir and column wall define a liquid discharge.

8. The contact and separation column according to claim 1, wherein the contact and separation units comprise a box shaped contact zone opening into one or more tubular separation zones.

9. The contact and separation column according to claim 1, wherein the gas outlet is bordered by a liquid flow deflector.

10. The contact and separation column according to claim 9, wherein the liquid flow deflector comprises a return skirt having a U-shaped radial cross section with an open side arranged over a top edge of the separation zone.

11. A process of treating gas with a liquid which process comprises introducing the gas at the gas inlet and liquid at the liquid inlet in a lower contact and separation cell of a contact and separation column according to claim 1.

12. The process of claim 11 wherein the flow velocity of the gas in the contact zone is lower than the flow velocity in the separation zone.

13. The process of claim 12 wherein the gas is natural gas.

* * * * *